(12) United States Patent
Barker et al.

(10) Patent No.: US 8,113,237 B2
(45) Date of Patent: Feb. 14, 2012

(54) SYSTEM FOR CONTROLLING FLUID LEVEL IN A SUMP

(75) Inventors: Charles Alan Barker, Indianapolis, IN (US); Walter Eric Palmer, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 508 days.

(21) Appl. No.: 12/414,298

(22) Filed: Mar. 30, 2009

(65) Prior Publication Data

US 2009/0277512 A1    Nov. 12, 2009

Related U.S. Application Data

(60) Provisional application No. 61/051,796, filed on May 9, 2008.

(51) Int. Cl.
*B67D 7/58* (2010.01)
(52) U.S. Cl. ............... 137/565.37; 137/625.48; 137/571
(58) Field of Classification Search ............. 137/565.11, 137/565.16, 565.17, 565.19, 565.29, 565.33, 137/565.37, 625.48, 571, 590; 184/6–11.5
See application file for complete search history.

(56) References Cited

U.S. PATENT DOCUMENTS

| | | | | |
|---|---|---|---|---|
| 2,743,900 A * | 5/1956 | Holzer et al. | | 251/174 |
| 2,964,104 A * | 12/1960 | Mcaulay | | 137/206 |
| 3,767,014 A * | 10/1973 | Drone | | 184/6.12 |
| 4,478,714 A * | 10/1984 | Blake et al. | | 210/136 |
| 5,115,887 A * | 5/1992 | Smith | | 184/6.4 |
| 5,778,922 A * | 7/1998 | Schoultz | | 137/208 |
| 7,124,732 B2 * | 10/2006 | Sugamuna et al. | | 123/196 R |
| 7,487,866 B2 * | 2/2009 | Kruse et al. | | 192/113.3 |
| 2001/0035215 A1 * | 11/2001 | Tipton et al. | | 137/571 |
| 2009/0211850 A1 * | 8/2009 | Moorman | | 184/6.12 |

* cited by examiner

*Primary Examiner* — Craig Schneider
*Assistant Examiner* — Jessica Cahill

(57) ABSTRACT

A system for controlling the level of hydraulic fluid between a first and second sump in a transmission includes a valve assembly located within the first sump. The valve assembly includes a valve that is moveable between two positions. The valve assembly includes first and second inlet ports that communicate with the first sump and an outlet port that communicates with the second sump. The second inlet port has an opening that is located higher than an opening to the first inlet port. Hydraulic fluid within the first sump communicates through the first inlet port to the outlet port when the valve is in the first position, and hydraulic fluid within the first sump communicates through the second inlet port to the outlet port when the valve is in the second position.

21 Claims, 3 Drawing Sheets

SYSTEM FOR CONTROLLING FLUID LEVEL IN A SUMP

CROSS-REFERENCE TO RELATED APPLICATIONS

This application claims the benefit of U.S. Provisional Application No. 61/051,796, filed on May 9, 2008. The disclosure of the above application is incorporated herein by reference.

FIELD

The invention relates generally to a system for controlling the fluid level in a sump, and more particularly to a system having a valve operable to control the fluid levels between two separate sumps in a transmission assembly.

BACKGROUND

The statements in this section merely provide background information related to the present disclosure and may or may not constitute prior art.

Heavy duty transmissions may include separate portions, such as a front portion and a rear portion, that are separated along the length of a vehicle or other kind of motorized equipment. These separate portions each may include a separate sump for storing hydraulic fluid, such as oil. This hydraulic fluid is pumped through the transmission between the separated portions. In certain operating conditions, it may be desirable to control the hydraulic fluid level within each separate sump in order to reduce parasitic power losses and to have sufficient hydraulic fluid circulation when the transmission is tilted at an angle, such as when the vehicle or motorized equipment is on a slope. Accordingly, there is a need in the art for a system for varying the level of hydraulic fluid within a sump in a transmission.

SUMMARY

The present invention provides a system for controlling the level of hydraulic fluid between a first and second sump in a transmission. The system includes a valve assembly located within the first sump. The valve assembly includes a valve that is moveable between two positions. The valve assembly also includes a first inlet port that communicates with the first sump, a second inlet port that also communicates with the first sump, and an outlet port that communicates with the second sump. The second inlet port has an opening that is located higher than an opening to the first inlet port. Hydraulic fluid within the first sump communicates through the first inlet port to the outlet port when the valve is in the first position, and hydraulic fluid within the first sump communicates through the second inlet port to the outlet port when the valve is in the second position. The level of the hydraulic fluid within the first sump is controlled by the height of the openings of the first and second inlet ports and the position of the valve.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
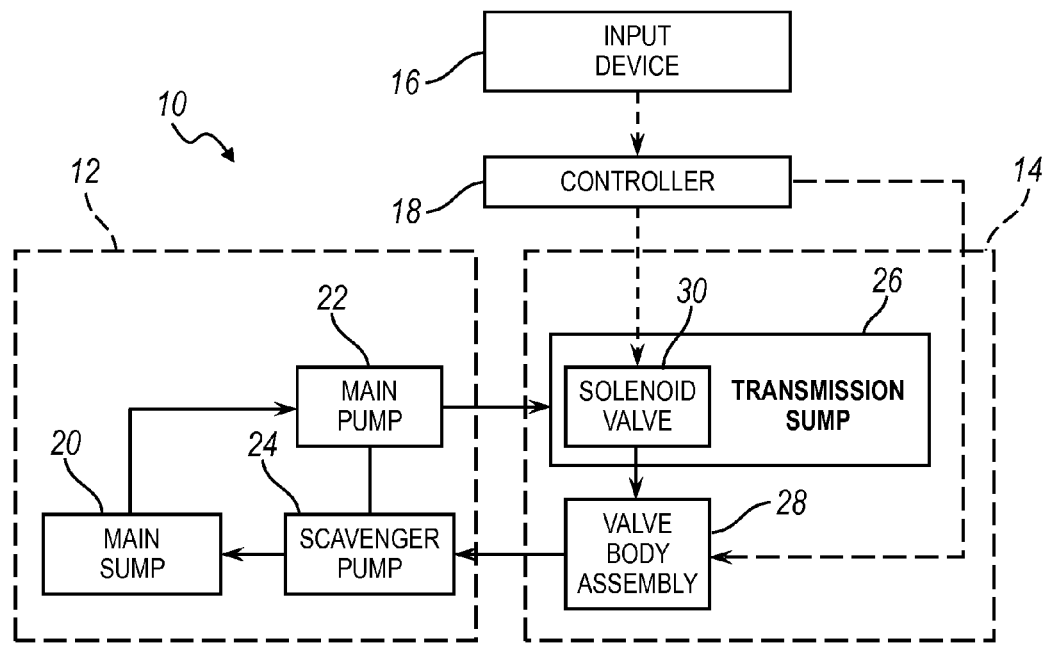
FIG. 1 is a schematic diagram of a system for controlling a hydraulic fluid level of a sump in a transmission according to the principles of the present invention.

With reference to FIG. 1, a system for controlling a level of a hydraulic fluid in a transmission is generally indicated by reference number 10. More specifically, the system 10 is selectively able to operate in at least two operating modes corresponding to different levels of hydraulic fluid, as will be described in greater detail below. The system 10 includes a first portion 12, a second portion 14, an input device 16, and a controller 18. In the present embodiment, the first portion 12 is connected to the second portion 14, however, the first portion 12 may be spaced apart from the second portion 14 without departing from the scope of the present invention. For example, the first portion 12 may be a power transfer module located in a front or rear of a vehicle operable to power auxiliary equipment through the transmission and the second portion 14 may be a transmission assembly having gearsets and clutches located in an opposite end of the vehicle from the first portion 12.

The first portion 12 includes a first or main sump 20, a first or main pump 22, and a second or scavenger pump 24. The main sump 20 is a tank or other receptacle operable to store a hydraulic fluid, such as oil. The hydraulic fluid stored in the main sump 20 is used by components in the first portion 12, such as, for example, rotatable shafts, auxiliary equipment gearing arrangements, and/or torque transmitting devices for hydraulic control functions, lubrication, and/or cooling. The main sump 20 preferably includes a filter (not shown) operable to remove particulates from the hydraulic fluid flow entering or exiting the main sump 20. The main pump 22 is in fluid communication with the main sump 20. The main pump 22 may take many forms, such as, for example, a crescent pump, an impeller pump, gear pump, or vane pump, without departing from the scope of the present invention. The main pump 22 is operable to pump the hydraulic fluid from the main sump 20 to the second portion 14, as will be described in further detail below. The scavenger pump 24 is in fluid communication with the main sump 20 and the main pump 22. The scavenger pump 24 may also take many forms, such as, for example, a crescent pump, an impeller pump, gear pump, or vane pump, without departing from the scope of the present invention. The scavenger pump 24 is operable to pump the hydraulic fluid from the second portion 14 to the main sump 20 and to the main pump 22, as will also be described in greater detail below.

The second portion 14 includes a second or transmission sump 26, a valve body assembly 28, and a solenoid valve assembly 30. The transmission sump 26 is a tank or other receptacle operable to store the hydraulic fluid. The hydraulic fluid stored in the transmission sump 26 is used by components throughout the second portion 14 such as, for example, rotatable shafts, gearing arrangements, and/or torque transmitting devices for hydraulic control functions, lubrication, and/or cooling. The transmission sump 20 preferably includes a filter (not shown) operable to remove particulates from the hydraulic fluid flow entering or exiting the transmission sump 26. The transmission sump 20 is in communication with the main pump 22. The valve body 28 is in fluid communication with the transmission sump 26 and the scavenger pump 24. The valve body assembly 28 is a hydraulic control circuit having a plurality of valves, solenoids, and/or actuators operable to hydraulically control components within the transmission, such as clutch actuators. The solenoid valve assembly 30 is located within the transmission sump 26 and is in communication with the valve body assembly 28 and the scavenger pump 24. The solenoid valve assembly 30 is operable to control the level or amount of hydraulic fluid stored within the transmission sump 26, as will be described in greater detail below.

The input device 16 is operable to initiate a mode of operation of the system 10. The input device 16 can take many forms, for example, an electronic shift selector or other shifting device or a switch or button located on the instrument panel of the motor vehicle. Alternatively, the input device 16 may be replaced by an automatic activation system used by the controller 18 to automatically initiate a mode of operation under specified operating conditions, such as detected transmission tilt.

The controller 18 is preferably an electronic control device having a preprogrammed digital computer or processor, control logic, memory used to store data, and at least one I/O peripheral. The control logic includes a plurality of logic routines for monitoring, manipulating, and generating data. For example, these logic routines are operable to set various operating parameters for the transmission including, but not limited to, selective clutch engagement to initiate gear shifts, solenoid activation, and torque converter clutch application. However, other types of controllers may be employed without departing from the scope of the present invention. The transmission controller 18 is in communication with at least the solenoid valve assembly 30 and the valve body assembly 28. More specifically, the transmission controller 18 is configured to send control signals to the solenoid valve assembly 30 in order to selectively actuate the solenoid valve assembly 30 in order to switch between the different operating modes of the system 10.

Figure 2:
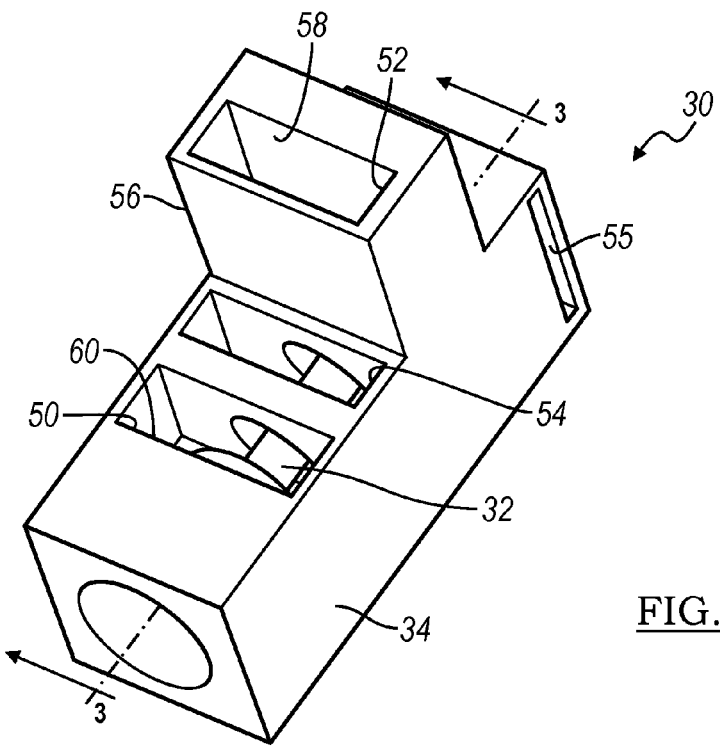
FIG. 2 is a perspective view of a solenoid valve assembly used in the system for controlling hydraulic fluid level in the sump according to the principles of the present invention.
Figure 3A:
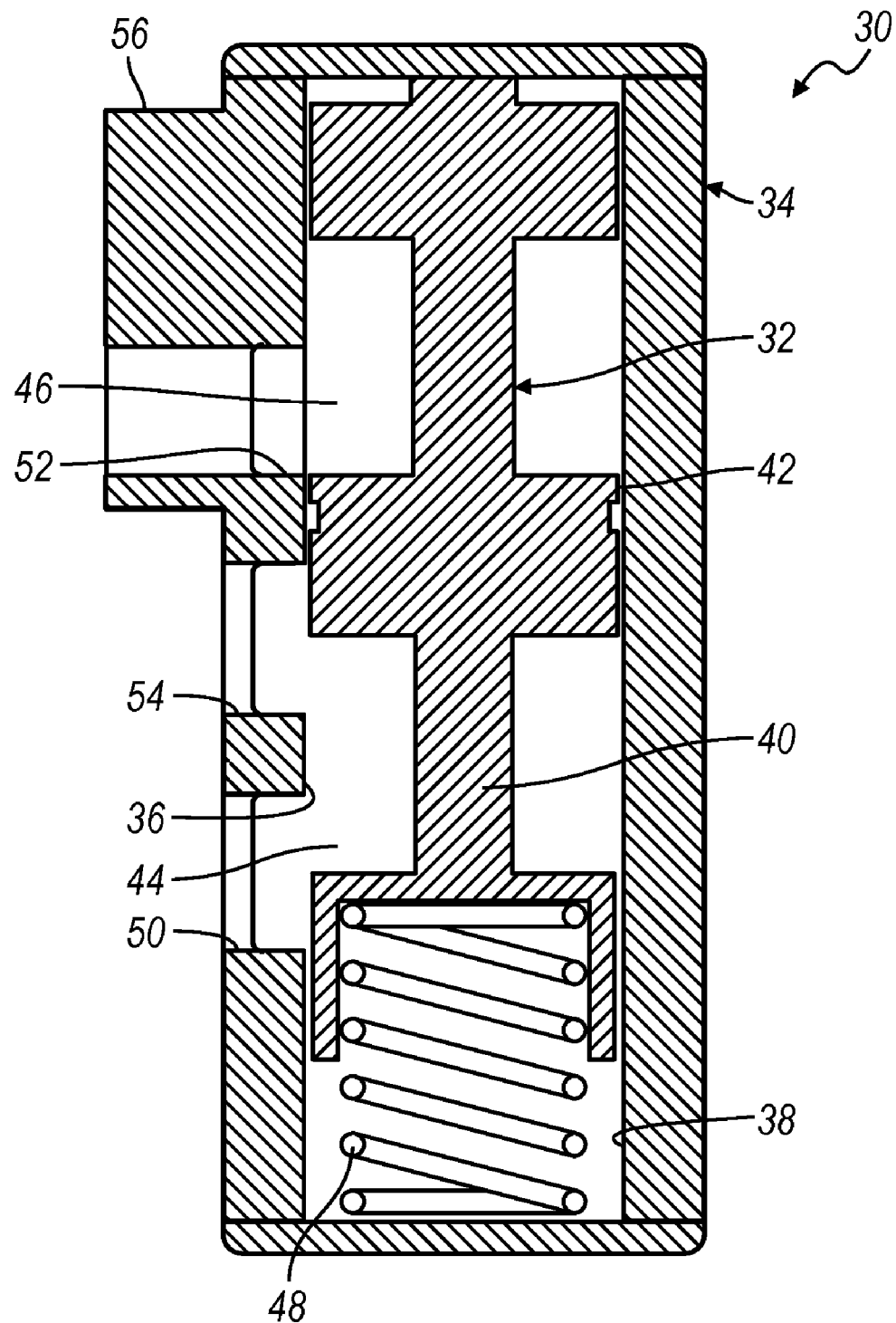
FIG. 3A is a cross-sectional view of the solenoid valve assembly taken in the direction of arrow 3-3 in FIG. 2 when the solenoid valve assembly is in a first position.
Figure 3B:
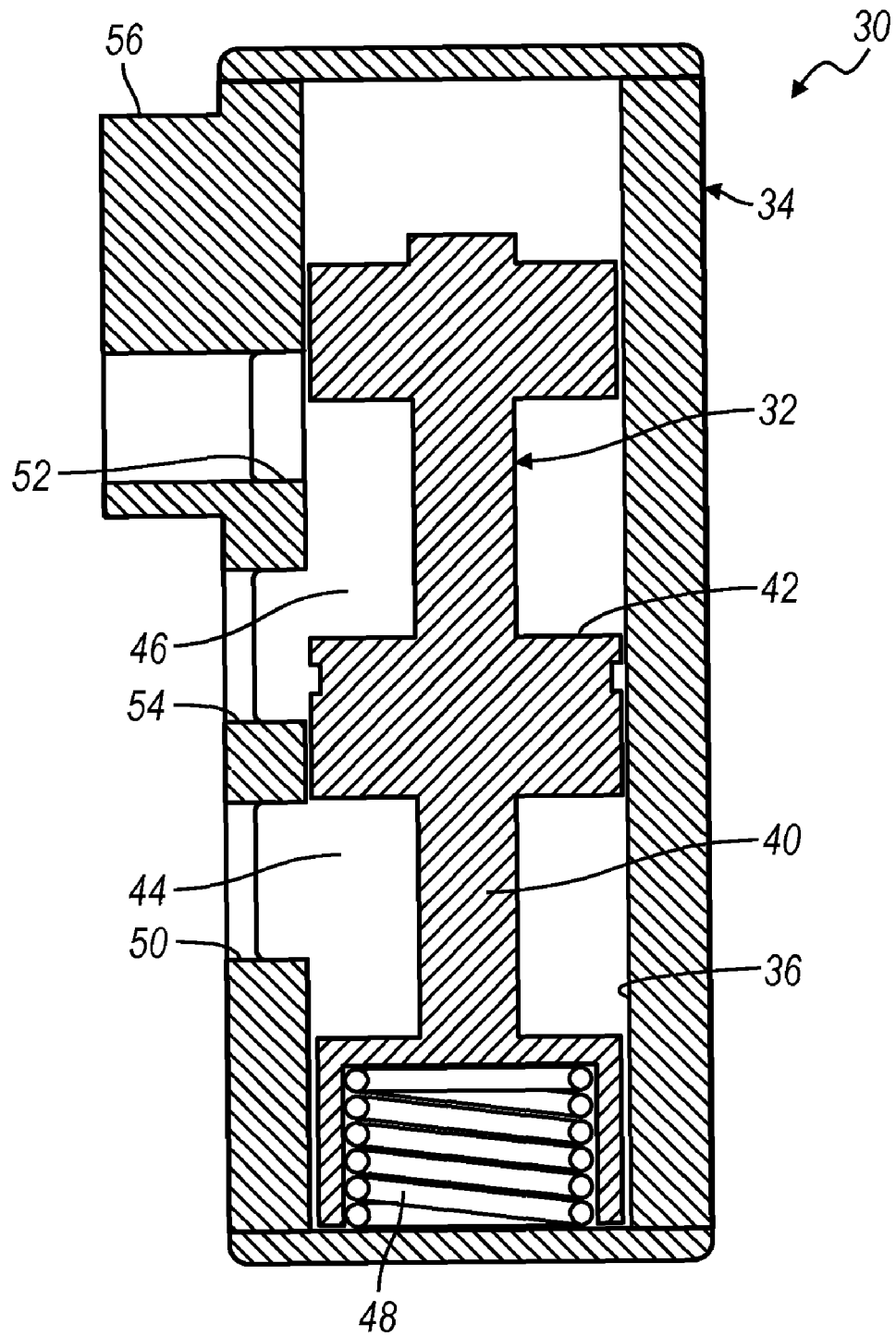
FIG. 3B is a cross-sectional view of the solenoid valve assembly taken in the direction of arrow 3-3 in FIG. 2 when the solenoid valve assembly is in a second position.

Turning to FIGS. 2, 3A, and 3B, the solenoid valve assembly 30 will now be described in further detail. The solenoid valve assembly 30 includes a valve 32 located within a valve body 34. More specifically, the valve body 34 includes a bore 36 that defines a valve chamber 38 and the valve 32 is slidably supported within the valve chamber 38. The valve 32 includes a central body 40 that extends along a length of the valve chamber 38. A land 42 extends from the central body 40 and engages the bore 36 of the valve chamber 38. The land 42 cooperates with the bore 36 of the valve chamber 38 to define a first fluid chamber 44 and a second fluid chamber 46 located on an opposite side of the land 40. The valve 32 is moveable within the valve chamber 38 between a first position, as illustrated in FIG. 3A, and a second position, as illustrated in FIG. 3B. A biasing member 48, such as a spring, is located within the valve chamber 38 between an end of the valve 32 and the bore 36. The biasing member 48 biases the valve 32 to the first position.

The valve body 34 further defines a plurality of fluid ports that connect with a plurality of fluid communication channels or passages (not shown) and the transmission sump 26. In the example provided, the valve body 34 includes a first inlet port or low fluid level port 50, a second inlet port or high fluid level port 52, an outlet port 54, and a third inlet port 55. The low fluid level port 50 communicates with the transmission sump 26 and the valve chamber 38. The high fluid level port 52 also communicates with the transmission sump 26 and the valve chamber 38. The high fluid level port 52 is located in an extension 56 that extends out from an outer surface 57 of the valve body 34. Accordingly, an opening 58 to the high fluid level port 52 is located at a distance or height above the valve 32 greater than a distance or height above the valve 32 of an opening 60 to the low fluid level port 50. The outlet port 54 is located between the low and high fluid level ports 50, 52 and communicates with the valve chamber 38 and the scavenger pump 24 via a plurality of fluid passages (not shown) preferably located within the valve body assembly 28. The third inlet port 55 communicates with the valve chamber 38 near an end of the valve 32 and with the valve body assembly 28.

With combined reference to FIGS. 1-3B, the operation of the system 10 will be described in greater detail. Under normal operating conditions, hydraulic fluid is pumped from the main pump 22 to the transmission sump 26. The scavenger pump 24 pumps the hydraulic fluid from the transmission sump 26 through the solenoid valve assembly 30 and through the valve body assembly 28 back to the main sump 20. During this circulation of the hydraulic fluid through the transmission, the hydraulic fluid lubricates, cools, and provides hydraulic control to the various components of the transmission. In a first mode of operation or normal mode of operation, the valve 32 is in the first position (FIG. 3A) such that the low fluid level port 50 communicates with the first fluid chamber 44 and with the outlet port 54. The land 42 hydraulically isolates the second fluid chamber 46 and the high fluid level port 52 from the outlet port 54. Accordingly, the hydraulic fluid in the transmission sump 26 will be drawn into the solenoid valve assembly 30 by the pumping action of the scavenger pump 24 connected to the outlet port 54 when the hydraulic fluid has reached the height of the opening 60 of the low fluid level port 50. A lower level of hydraulic fluid within the transmission sump 26 forces the main sump 20 to have a higher level or amount of hydraulic fluid than the transmission sump 26.

During a second mode of operation or a power saving mode of operation, the valve 32 is moved to the second position (FIG. 3B) by a pressurized fluid communicated through the third inlet port 55 such that the high fluid level port 52 communicates with the second fluid chamber 46 and with the outlet port 54. The land 42 hydraulically isolates the first fluid chamber 44 and the low fluid level port 50 from the outlet port 54. Accordingly, the hydraulic fluid in the transmission sump 26 will be drawn into the solenoid valve assembly 30 by the pumping action of the scavenger pump 24 connected to the outlet port 54 when the hydraulic fluid has reached the height of the opening 58 of the high fluid level port 52. A higher level of hydraulic fluid within the transmission sump 26 forces the main sump 20 to have a lower level or amount of hydraulic fluid than the transmission sump 26.

By selectively positioning the valve 32 of the solenoid valve assembly 34, the system 10 is operable to control the amount or level of hydraulic fluid within the transmission sump 26 and therefore the main sump 20. Maintaining a lower fluid level within the main sump 20 in turn lowers parasitic power losses and is operable to increase the efficiency of the transmission.

The description of the invention is merely exemplary in nature and variations that do not depart from the gist of the invention are intended to be within the scope of the invention.

We claim the following:

1. A device for controlling a level of hydraulic fluid in a first fluid reservoir and a second fluid reservoir in a transmission, the device comprising:
   a valve body disposed within the first fluid reservoir, the valve body comprising:
      an outer surface;
      an inner surface that defines a bore;
      a first opening disposed in the outer surface a first distance from the bore, wherein the first opening is in communication with the bore;
      a second opening disposed in the outer surface a second distance from the bore, wherein the second opening is in communication with the bore, and wherein the second distance is greater than the first distance;
      an outlet in communication with the bore and the second fluid reservoir; and
   a valve disposed within the bore of the valve body and moveable between at least a first position and a second position, wherein the hydraulic fluid is prevented from exceeding a first predefined level by positioning the valve in the first position to allow hydraulic fluid to flow from the first opening to the outlet thereby moving the hydraulic fluid from the first fluid reservoir to the second fluid reservoir, and wherein the hydraulic fluid is prevented from exceeding a second predefined level by positioning the valve in the second position to allow hydraulic fluid to flow from the second opening to the outlet thereby moving the hydraulic fluid from the first fluid reservoir to the second fluid reservoir.

2. The device of claim 1 wherein the valve includes a land sealingly engaged with the bore, and the land prevents communication between the first opening and the outlet when the valve is in the second position and the land prevents communication between the second opening and the outlet when the valve is in the first position.

3. The device of claim 1 wherein the outlet is disposed in the outer surface between the first opening and the second opening along the longitudinal axis.

4. The device of claim 1 wherein the valve body includes an extension on the outer surface and the second opening is located within the extension.

5. The device of claim 3 wherein the bore defines a longitudinal axis, and the first distance is measured radially from the longitudinal axis to the first opening and the second distance is measured radially from the longitudinal axis to the second opening.

6. The device of claim 1 wherein the outer surface is a top surface of the valve body and the valve body is located at a bottom of the first fluid reservoir.

7. The device of claim 6 wherein the first predefined level of hydraulic fluid is measured from the bottom of the first fluid reservoir to substantially the first opening.

8. The device of claim 7 wherein the second predefined level of hydraulic fluid is measured from the bottom of the first fluid reservoir to substantially the second opening.

9. A system for controlling a level of hydraulic fluid in a transmission of a motor vehicle, the system comprising:
   a first fluid reservoir;
   a second fluid reservoir;
   a first pump in communication with the first fluid reservoir and with the second fluid reservoir, the first pump operable to pump hydraulic fluid from the second fluid reservoir to the first fluid reservoir;
   a valve assembly located within the first fluid reservoir and comprising:
      a valve body that defines a bore, a first opening in communication with the bore and with the first fluid reservoir, a second opening in communication with the bore and with the first fluid reservoir, and an outlet opening that communicates with the bore, wherein the second opening is located farther from the bore than the first opening; and
      a valve disposed within the bore and moveable between at least a first position and a second position, wherein the hydraulic fluid is prevented from exceeding a first predefined level by positioning the valve in the first position to allow hydraulic fluid to flow from the first opening to the outlet thereby moving the hydraulic fluid from the first fluid reservoir to the second fluid reservoir, and wherein the hydraulic fluid is prevented from exceeding a second predefined level by positioning the valve in the second position to allow hydraulic fluid to flow from the second opening to the outlet thereby moving the hydraulic fluid from the first fluid reservoir to the second fluid reservoir; and
   a second pump in communication with the outlet opening of the valve assembly and with the second fluid reservoir, the second pump operable to pump hydraulic fluid from the first fluid reservoir via the valve assembly to the second fluid reservoir.

10. The system of claim 9 wherein the first pump and second fluid reservoir are part of a power transfer module operable to power auxiliary equipment through the transmission and the second fluid reservoir is located in an opposite end of the vehicle from the first pump and the second fluid reservoir.

11. The system of claim 9 wherein the valve includes a land sealingly engaged with the bore and the land prevents communication between the first opening and the outlet when the valve is in the second position and prevents communication between the second opening and the outlet when the valve is in the first position.

12. The system of claim 11 wherein the valve body includes an extension on the outer surface and the second opening is located on the extension.

13. The system of claim 12 wherein the bore defines a longitudinal axis, and the first opening is located a first radial distance from the longitudinal axis and the second opening is located a second radial distance from the longitudinal axis, wherein the second radial distance is greater than the first radial distance.

14. The system of claim 13 wherein the outlet is located between the first opening and the second opening along the longitudinal axis.

15. The system of claim 14 wherein the outer surface is a top surface of the valve body, and the valve body is positioned within the first fluid reservoir such that the top surface is substantially parallel to a surface of the hydraulic fluid within the first fluid reservoir.

16. The system of claim 9 further comprising a biasing member located between the valve body and the valve and operable to bias the valve into at least one of the first and second positions.

17. The system of claim 16 further comprising a solenoid in hydraulic communication with the valve assembly, the solenoid operable to selectively communicate a hydraulic fluid to the valve assembly to move the valve against the bias of the biasing member.

18. The system of claim 17 further comprising a controller in communication with the solenoid for controlling the operation of the solenoid.

19. The system of claim 18 further comprising an input device in communication with the controller, wherein engagement of the input device by an operator is indicative of a desired level of hydraulic fluid within at least one of the first fluid reservoir and the second fluid reservoir, and the controller is operable to activate the solenoid when the input device is engaged.

20. The system of claim 9 wherein the first pump, second pump, and second fluid reservoir are located in a first portion and the first fluid reservoir is located in a second portion, wherein the first portion is forward of the second portion relative to the vehicle.

21. The system of claim 20 wherein the second portion further includes a hydraulic control circuit in communication with the first fluid reservoir and the second pump.

* * * * *